Sept. 30, 1958  J. E. WOODS  2,853,879
TEMPERATURE SENSING MEANS
Filed March 27, 1956

*INVENTOR.*
JOHN E. WOODS
BY *Kenway Jenney*
*Witter & Hildreth*
ATTORNEYS

United States Patent Office 2,853,879
Patented Sept. 30, 1958

2,853,879

TEMPERATURE SENSING MEANS

John E. Woods, Cohasset, Mass., assignor to Standard-Thomson Corporation, Waltham, Mass., a corporation of Delaware Application March 27, 1956, Serial No. 574,216

1 Claim. (Cl. 73—343)

The present invention relates to stove controls, and more particularly to means for sensing the temperature of a vessel on a stove or other similar heating unit.

The principal object of the invention is to provide sensitive means for ascertaining the temperature of the vessel wall, as distinguished from the temperature of the flame or resistance element heating the vessel. Accordingly, it is desired to achieve good heat exchange between the sensing element and the vessel, but relatively poor heat exchange between the sensing element and the heating element.

A further object is to achieve compactness of the arrangement by means of a sensing element situated at or near the center of the heating element in a suitable opening provided therefor.

A further object is to provide means for causing the sensing element to bear resiliently against the wall of the vessel so as to achieve the best possible heat exchange relationship therewith, and also uniformity of temperature control.

A still further object is to provide a temperature sensing element for thermostatic stove controls of the forms now used in the art. Thus the controls may be set to turn the heating element or burner off if the temperature of the vessel indicates that the water therein has evaporated; or the amount of heat given off by the stove may be increased or decreased to a desired amount as a function of the temperature of the vessel being heated.

Hitherto, the devices employed in the art to satisfy the foregoing objects have been of a complicated design with a commensurate high cost. Also, sensitivity has been sacrificed.

With the foregoing and other objects in view, the features of the invention comprise an improvement upon vessel temperature sensing means having considerable sensitivity. Further features include simplicity of construction and freedom from troublesome adjustments and repairs, these features being particularly desirable in controls of this type.

The foregoing and other features will be readily apparent from the following description of a preferred form of the invention, and of the method of fabrication, together with alternative embodiments.

In the drawings, Fig. 1 is a partial sectional elevation through the center of a stove element showing the construction of the temperature sensing means;

Figure 1:
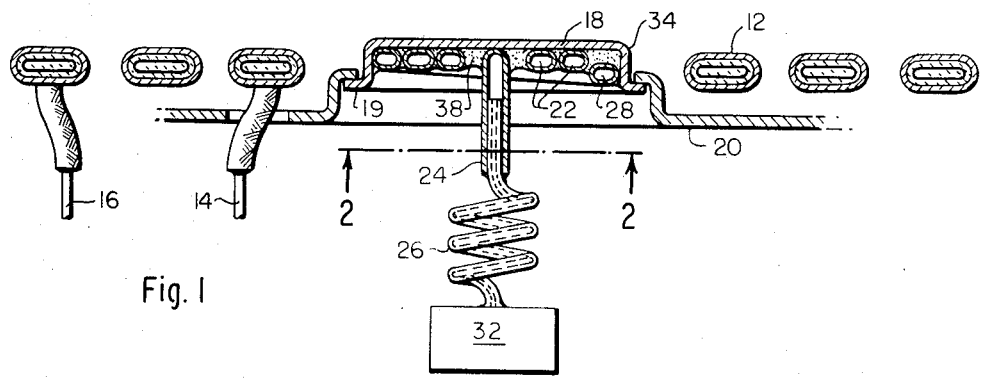
Figure 2:
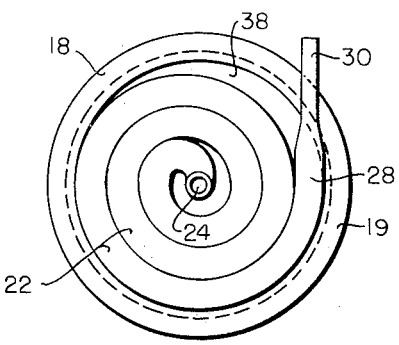
Fig. 2 is a bottom elevation taken on line 2—2 of Fig. 1.

Referring to Fig. 1, there is shown for illustration an electric heating element 12 for a cooking stove, said element having ends 14 and 16 for connection to a suitable source of electric power. It will be apparent, however, that the invention contemplates also the use of other forms of heating elements, such as those using gas, gasoline, kerosene and the like. The element is formed in the shape of a flat coil having an opening in its central portion to receive the temperature sensing element. This element includes an inverted, cup-shaped member 18 with an outwardly extending flange 19 to engage an inwardly extending flange of a fixed metallic support 20. As hereinafter described, the member 18 is urged resiliently upward so that it protrudes slightly above the heating element 12, whereby the member 18 positively and resiliently engages any vessel placed on the element.

Within the member 18 is a thermal bulb consisting of a length of slightly flattened round metallic tubing 22 formed tightly in a flat coil with the turns thereof firmly in contact with the inner wall of the member 18. A central, downwardly extending straight portion 24 of the bulb is open at the end and adapted to receive a loosely coiled length of capillary 26, to which it is soldered. The outermost turn 28 of the bulb is preferably bent downwardly so as to expose slightly an end portion 30. The portion 30 is adapted for filling the bulb 22 and the attached capillary 26 with a thermal liquid. After filling, the portion 30 is sealed off at the end, as by crimping and soldering in accordance with conventional practice.

The capillary 26 is connected at its lower end with a control element 32 which may be any suitable pressure-responsive actuator, for example that of my copending application Serial No. 420,120, filed March 31, 1954. This actuator may be used to control switches, valves or other means to provide indication or control of the temperature sensed by the thermal liquid. The specific means are not shown or described herein as they form no part of the present invention.

It will be observed that the coiled capillary 26 provides means for urging the cup-shaped member 18 upwardly until arrested either by a vessel on the element 12 or by the inwardly-turned flange of the stationary member 20.

The coiled bulb 22 is fused with the inner wall of the member 18 by silver soldering or brazing with a quantity of metal 38 that substantially fills the interstices between the coils of the tubing and between the tubing and the wall of the member 18. This provides very good heat exchange between the outer surface of the member 18 and the thermal liquid. Sensitivity is further improved by flattening the coils of the tubing somewhat as shown in Fig. 1, whereby a substantial area of the tubing is in direct contact with the member 18, as well as being connected therewith through the solder or brazing metal 38.

The cup-shaped member 18 is preferably constructed of two layers of metal, an outside layer or plating 34 of corrosion-resistant metal such as stainless steel, and a substantially thicker inside layer which, like the bulb 22, is preferably of copper. An advantage arising from this construction is that the exposed surface of the plating 34 is easily cleaned and has a desirable appearance, while the inside surface in contact with the tubing is of the same metal as the tubing. It is thus possible, using copper tubing as the preferred metal for the bulb, to utilize a soldering technique well known in the art which does not require the use of flux when the two surfaces being bonded are of the same metal. This eliminates the necessity of washing and cleaning away the flux after soldering.

It will be observed that the illustrated construction is relatively simple to fabricate and does not involve parts of complicated shape requiring numerous forming operations. This greatly reduces the over-all cost of manufacture, while affording very considerable sensitivity by reason of the closed fused metallic contact between the thermal liquid and the surface of the member 18.

Figure 3:
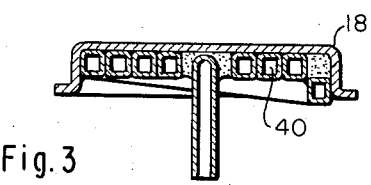
Fig. 3 is a view in section of an alternative form of sensing element.

An alternative form of coil 40 is shown in Fig. 3. This coil is of square cross section, affording the greatest possible area of direct contact between the bulb and the member 18. However, with this form of construction it is necessary to pass the tubing through suitable dies to obtain the desired cross section, and this may be desirable only where the maximum sensitivity is required.

Figure 4:
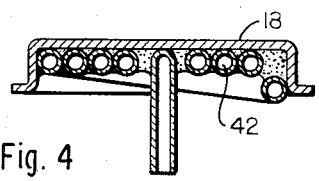
Fig. 4 is a view of another alternative embodiment of the sensing element.

A second alternative form of coil 42 is shown in Fig. 4. This is tubing of unflattened, round cross section such as is commonly available in the market. Since round tubing is most available, this alternative has a possible slight cost advantage over that of Fig. 1, but sacrifices some of the sensitivity of the latter.

It will be understood that, while the invention has been described with reference to specific embodiments thereof as employed in an electric cook stove control, such adaptations or variations in design and structure as would occur to one skilled in the art upon a reading of the foregoing specification are also within the spirit and scope thereof.

Having thus described the invention, I claim:

A device for sensing the temperature of a cooking vessel having, in combination: a support provided with an opening adjacent a surface of said vessel; a round metallic cup-shaped member received in said opening including a substantially flat central portion in position to engage said vessel, a side wall fitted within said opening and a flange extending outwardly from said wall to engage the support at said opening; spring means urging said member resiliently toward said vessel and said flange into engagement with said support at said opening; a length of metallic tubing bent in the form of a round flat coil and received in said cup-shaped member with the turns of the coil firmly in contact with the surface of said central portion opposite to said vessel; and a body of heat conductive metal fused to said coil and said central portion and filling the interstices between the turns of the coil and between the coil and said member, said tubing having an end for connection with a capillary and being filled with a thermal sensitive liquid.

References Cited in the file of this patent

UNITED STATES PATENTS

| | | |
|---|---|---|
| 997,187 | Fournier | July 4, 1911 |
| 1,724,804 | Root | Aug. 13, 1929 |
| 2,500,061 | Clark | Mar. 7, 1950 |